United States Patent
Fellmeth

(10) Patent No.: US 8,800,427 B2
(45) Date of Patent: Aug. 12, 2014

(54) HYDRAULIC FLUID PUMP HAVING A SEALING ELEMENT

(75) Inventor: Reiner Fellmeth, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 885 days.

(21) Appl. No.: 12/812,132

(22) PCT Filed: Nov. 25, 2008

(86) PCT No.: PCT/EP2008/066115
§ 371 (c)(1),
(2), (4) Date: Aug. 12, 2010

(87) PCT Pub. No.: WO2009/086988
PCT Pub. Date: Jul. 16, 2009

(65) Prior Publication Data
US 2010/0294126 A1    Nov. 25, 2010

(30) Foreign Application Priority Data
Jan. 8, 2008  (DE) .......................... 10 2008 003 454

(51) Int. Cl.
*F04B 53/02*    (2006.01)

(52) U.S. Cl.
USPC ................................................ 92/99; 92/168

(58) Field of Classification Search
USPC ............... 92/83, 84, 96, 98 R, 99, 165 R, 168
See application file for complete search history.

(56) References Cited

U.S. PATENT DOCUMENTS

| 4,773,305 | A |   | 9/1988 | Nissels |
| 5,746,111 | A | * | 5/1998 | Mueller et al. .................. 92/168 |
| 6,299,419 | B1 | * | 10/2001 | Hunklinger et al. ............. 92/99 |
| 6,338,295 | B1 |   | 1/2002 | Kubota et al. |
| 6,341,950 | B1 |   | 1/2002 | Schuller et al. |
| 6,598,512 | B2 | * | 7/2003 | Siegel ............................. 92/168 |

FOREIGN PATENT DOCUMENTS

| DE | 1266589 B |   | 4/1968 |
| DE | 4205122 A1 |   | 8/1993 |
| DE | 19752546 A1 | * | 9/1998 |
| JP | 49-30903 A |   | 3/1974 |
| JP | 62-47782 U |   | 3/1987 |
| JP | 11-257245 A |   | 9/1999 |
| JP | 2000-213468 A |   | 8/2000 |
| JP | 2000-310183 A |   | 11/2000 |
| JP | 2000310183 A | * | 11/2000 |
| JP | 2004-339948 A |   | 12/2004 |

* cited by examiner

*Primary Examiner* — Thomas E Lazo
(74) *Attorney, Agent, or Firm* — Maginot, Moore & Beck

(57) ABSTRACT

In a hydraulic fluid pump, in particular for a vehicle brake system, having a housing and a piston that is mounted in an axially movable manner in the housing in a piston chamber. A drive moves the piston and a sealing element seals off the piston chamber in the direction of the drive. The sealing element is designed as a diaphragm that extends through the piston chamber transversely with respect to the movement direction of the piston.

20 Claims, 2 Drawing Sheets

HYDRAULIC FLUID PUMP HAVING A SEALING ELEMENT

CROSS-REFERENCE TO RELATED APPLICATION

This application is a 35 USC 371 application of PCT/EP2008/066115 filed on Nov. 25, 2008.

BACKGROUND OF THE INVENTION

1. Field of the Invention

The invention relates to a hydraulic fluid pump, in particular of a vehicle brake system, having a housing, a piston supported axially displaceably in the housing in a piston chamber, a drive moving the piston, and a sealing element sealing off the piston chamber from the drive. The invention also relates to a vehicle brake system having such a hydraulic fluid pump, and to a sealing element of a hydraulic fluid pump, which element is provided for insertion into a piston chamber of a housing of the hydraulic fluid pump, in which a piston is supported axially movably, which piston is movable by means of a drive.

2. Description of the Prior Art

In known hydraulic fluid pumps of vehicle brake systems, such as those used for instance to return hydraulic fluid during a function as an anti-lock system, pump force housings are embodied in which as a rule two pistons are displaceably supported. Each of the pistons is assigned to one brake circuit. The pistons are displaced axially back and forth by means of a single eccentric drive, and in this way, hydraulic fluid is aspirated into a pressure chamber embodied upstream of the piston and delivered out of that pressure chamber. The pressure chamber is surrounded by its own housing sleeve or a cylinder, which is also sealed off toward the piston. A cylinder and a piston form a so-called pump element, which is inserted into the housing in a stepped bore and is often pressed from outside. The piston protrudes onward into the housing into a region in which the eccentric drive is located at the end. In this region, here called the piston chamber, the supply of hydraulic fluid into the cylinder is also embodied. The annular gap that fundamentally exists between the piston and the housing must be sealed off by means of a sealing element in the form of a sealing ring. Thus the sealing ring seals off between the so-called low-pressure side of the piston and an eccentric chamber that belongs to the eccentric drive.

The sealing rings used, known as O-rings or Q-rings, are usually made from EPDM (ethylene-propylene-diene rubber) and fundamentally have a comparatively good sealing performance. However, in the currently known constructions, as a result of a relative motion between the piston and the sealing ring, a gradual leakage of hydraulic fluid or brake fluid into the eccentric chamber of the eccentric drive nevertheless occurs. Upon increased leakage into the eccentric chamber, the brake fluid can even reach the motor of the eccentric drive, which in some circumstances can damage it and/or lead to its failure.

OBJECT AND ADVANTAGES OF THE INVENTION

It is an object of the present invention to create a vehicle brake system having a hydraulic fluid pump in which the aforementioned disadvantages are overcome, and in particular in which leakage of hydraulic fluid into the eccentric chamber of the hydraulic fluid pump is even better prevented than is the case in known hydraulic fluid pumps.

According to the invention, a hydraulic fluid pump, in particular of a vehicle brake system, is designed, having a housing, a piston supported axially displaceably in the housing in a piston chamber, a drive moving the piston, and a sealing element sealing off the piston chamber from the drive, in which the sealing element is designed as a diaphragm, which penetrates the piston chamber transversely to the direction of motion of the piston. The object is also attained with a vehicle brake system having such a hydraulic fluid pump. The object is furthermore attained with a sealing element of a hydraulic fluid pump, which element is provided for insertion into a piston chamber of a housing of the hydraulic fluid pump, in which a piston is supported axially movably, which piston is movable by means of a drive, and which element is designed as a diaphragm, which in the state inserted into the housing penetrates the piston chamber transversely to the direction of motion of the piston.

According to the invention, with the aid of a diaphragm, complete sealing off of the hydraulic region of a hydraulic fluid pump from its working region is created. To that end, according to the invention, a diaphragm penetrating the piston chamber transversely to the direction of motion of the piston is disposed in the piston chamber in which the piston of the hydraulic fluid pump is disposed axially displaceably. The axial motion of the piston, which preferably amounts to approximately 2 mm, is made possible according to the invention by an elasticity of the diaphragms. To that end, especially advantageously, the diaphragm of the invention can in at least some portions have the form of a bellows.

With the complete sealing off, created according to the invention, between the hydraulic region and the drive region of the hydraulic fluid pump, in particular of a vehicle brake system, it is in particular not possible for any hydraulic fluid or brake fluid to penetrate the drive region of the hydraulic fluid pump, the eccentric disposed there, or the electric motor also located there. Damage to the electric motor that would otherwise be possible is thus prevented, and the danger of failure of the entire associated vehicle brake system is lessened considerably.

The diaphragm provided according to the invention is especially preferably mounted in stationary fashion on the housing. To that end, the diaphragm is especially advantageously inserted in a groove on the housing, as a result of which a form-locking connection is made between the housing and the diaphragm, and as a result a durably unchanged position of the diaphragm over the entire time of operation of the hydraulic fluid pump of the invention is ensured. Furthermore, the diaphragm of the invention can be inserted and fixed positionally accurately especially easily in such a groove upon its assembly.

In the hydraulic fluid pump of the invention, its piston is furthermore preferably designed in two parts, in which case the diaphragm of the invention is disposed between the two parts of the piston.

Between the thus-disposed diaphragm and the associated piston parts, a tensile-force-transmitting connection can be embodied. Alternatively, the connection can be designed to be only pressure-force-transmitting, especially because the piston parts merely rest on the diaphragm, which can be ensured for instance by means of a resilient prestressing of the two piston parts of the piston in the direction of the associated drive. It is therefore furthermore preferred according to the invention that the piston of the hydraulic fluid pump be resiliently prestressed counter to the drive.

BRIEF DESCRIPTION OF THE DRAWINGS

One exemplary embodiment of the version according to the invention will be described below in further detail, in conjunction with the accompanying schematic drawings, in which.

DESCRIPTION OF THE PREFERRED EMBODIMENT

Figure 1:
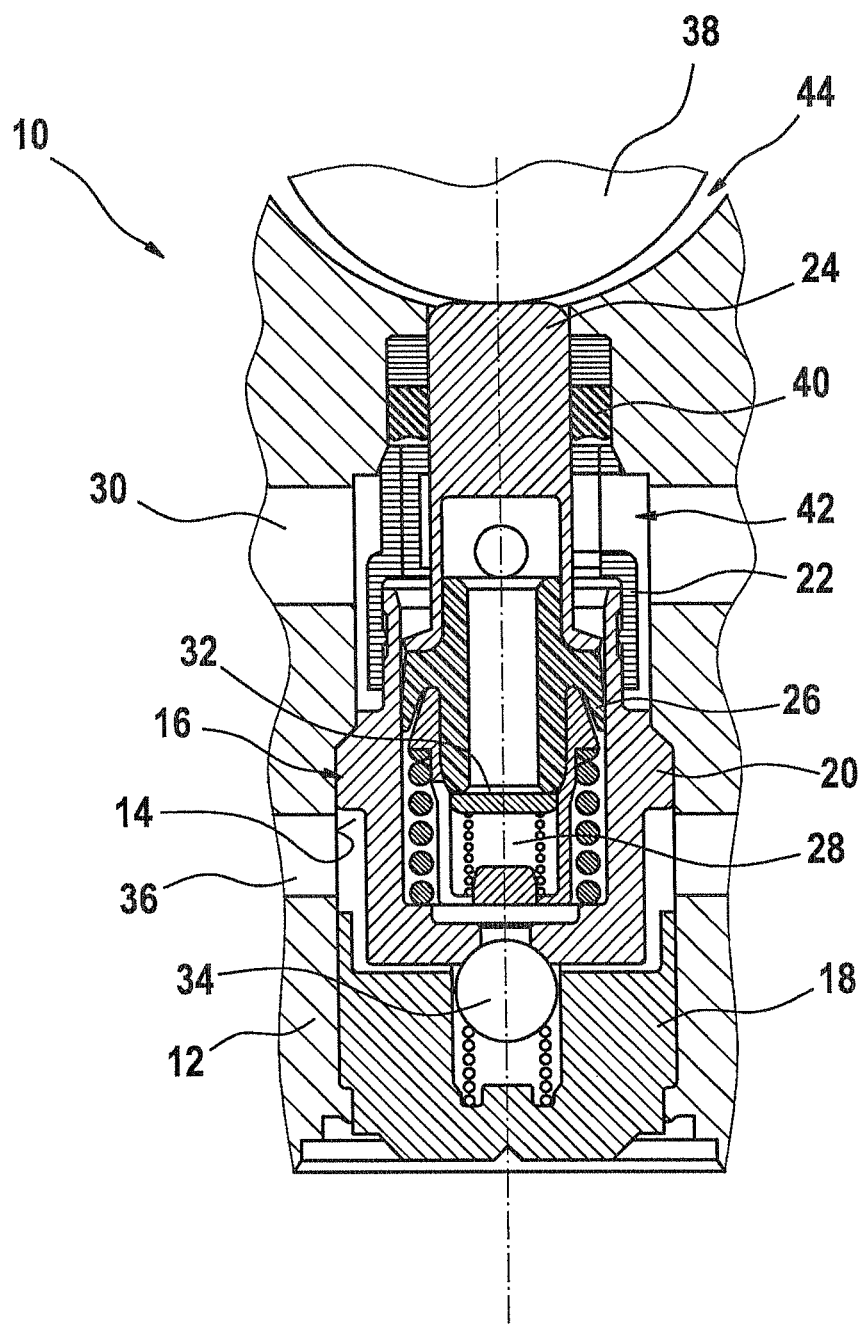
FIG. 1 is a longitudinal section through an exemplary embodiment of a hydraulic fluid pump in accordance with the prior art.

In FIG. 1, a hydraulic fluid pump 10 is shown, which is disposed in a block-shaped housing 12 of a hydraulic unit, not otherwise shown, of a vehicle brake system. The hydraulic unit, in vehicle brakes of an associated vehicle, in particular ensures an anti-lock and traction control function (ABS and TC).

A stepped bore 14 is embodied in the housing 12, and the actual pump element 16 of the hydraulic fluid pump 10 is disposed in this bore. The pump element 16 has three housing or cylinder elements 18, 20 and 22, which surround a piston 24 and together with part of the housing 12 form a cylinder for the piston 24. In the cylinder of this kind, the piston 24 is sealed off with a piston seal 26 from a pressure chamber 28 and is displaceable in the axial direction of the piston 24.

Upon displacement of the piston 24, this piston aspirates hydraulic fluid (not further shown) into the pressure chamber 28, through an inlet 30 and an inlet valve 32, and expels it out of the pressure chamber 28 as well, through an outlet valve 34 and an outlet 36. In the process, the piston 24 is moved in the stepped bore 14 by an eccentric drive 38.

To demarcate the hydraulic side of the hydraulic fluid pump 10 of this kind from the mechanical or electrical side of its drive, a sealing ring 40 is provided. This sealing ring 40 surrounds the piston 24 and seals the inlet 30, or so-called low-pressure side or piston chamber 42 of the pump element 16, from the eccentric drive 38 and from an eccentric chamber 44 located there. The sealing ring 40 is therefore also called a low-pressure sealing element.

To that end, the sealing ring 40 is disposed in stationary fashion in the stepped bore 14 of the housing 12, and the piston 24, in its pumping motion, moves counter to the pressure chamber 28 along the sealing ring 40. In this relative motion between the sealing ring 40 and the piston 24, gradual leakage of hydraulic fluid can occur, as a result of which hydraulic fluid can get into the eccentric chamber 44, and damage, particularly to a motor (not shown) of the eccentric drive 38, can occur.

Figure 2:
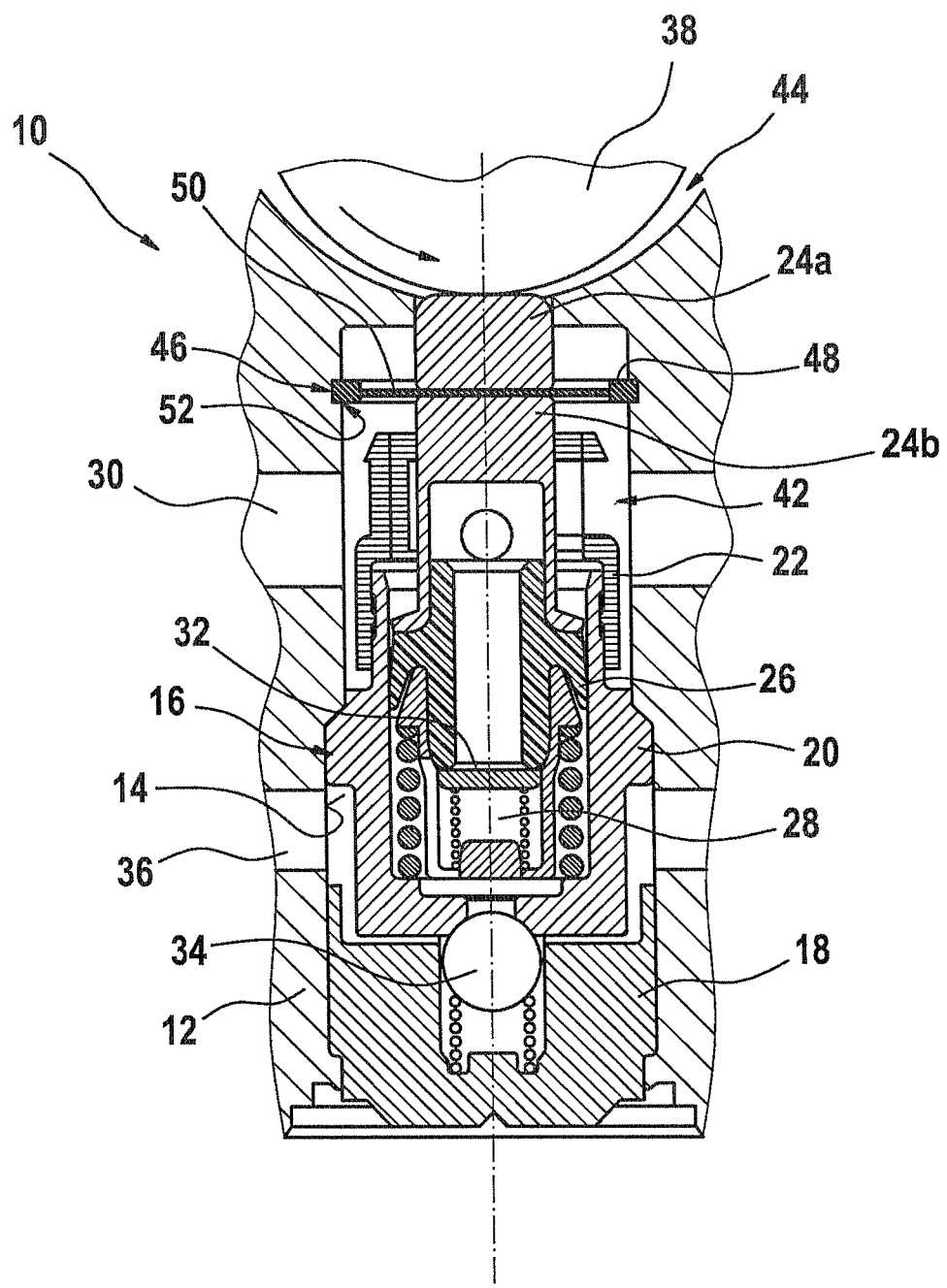
FIG. 2 is a longitudinal section through an exemplary embodiment of a hydraulic fluid pump in accordance with the invention.

In FIG. 2, a hydraulic fluid pump 10 according to the invention is shown, which in terms of the components 12 through 38 is designed essentially identically to the hydraulic fluid pump 10 of the prior art of FIG. 1.

However, in the hydraulic fluid pump 10 of FIG. 2, a diaphragm 46 is used as the low-pressure sealing element in the stepped bore 14 of the housing, and it penetrates the piston chamber 42 transversely to the direction of motion of the piston 24. The piston 24 is designed in two parts; one piston part 24a rests on the eccentric drive 38 and extends as far as the diaphragm 46, and the second piston part 24b extends from the diaphragm 46 into the pressure chamber 28.

The diaphragm 46 is disposed in stationary fashion on the housing 12 and designed elastically, in such a way that an axial stroke of the piston 24, or of the piston parts 24a and 24b, relative to the housing 12 is possible.

To that end, the diaphragm 46 has a radially outer peripheral region 48, which is retained in stationary fashion on the housing 12. Radially inward from the peripheral region 48, the diaphragm 46 is designed with an elastic inner region 50, which is also called a diaphragm. This inner region 50 can be linear in cross section, as shown, and/or it may have undulating portions.

For mounting the diaphragm 46 in stationary fashion on the housing 12, a (circumferential) groove 52 is embodied in the housing.

The diaphragm 46 of this kind leads to a hermetic separation of the low-pressure side or piston chamber 42 from the eccentric chamber 44 of the hydraulic fluid pump 10 of the invention in FIG. 2 and thus prevents any possible leakage whatsoever of hydraulic fluid into the eccentric chamber 44.

The foregoing relates to the preferred exemplary embodiment of the invention, it being understood that other variants and embodiments thereof are possible within the spirit and scope of the invention, the latter being defined by the appended claims.

The invention claimed is:

1. A hydraulic fluid pump, in particular of a vehicle brake system, having a housing, a piston chamber on a low-pressure side of the hydraulic fluid pump, a piston supported axially displaceably in the housing in the piston chamber, a drive moving the piston, and a sealing element sealing off the piston chamber from the drive, in which the sealing element is designed as a diaphragm, which penetrates the piston chamber transversely to a direction of motion of the piston, wherein the piston includes a first piston part and a second piston part, and the diaphragm is disposed between the first piston part and the second piston part, the first piston part configured to rest on the drive and to extend to the diaphragm, and the second part disposed on another side of the diaphragm.

2. The hydraulic fluid pump as defined by claim 1, wherein the diaphragm is mounted in stationary fashion on the housing.

3. The hydraulic fluid pump as defined by claim 2, wherein the diaphragm on the housing is inserted into a groove.

4. The hydraulic fluid pump as defined by claim 3, wherein the piston is prestressed resiliently counter to the drive.

5. A vehicle brake system having a hydraulic fluid pump as defined by claim 3.

6. The hydraulic fluid pump as defined by claim 2, wherein the piston is prestressed resiliently counter to the drive.

7. A vehicle brake system having a hydraulic fluid pump as defined by claim 2.

8. The hydraulic fluid pump as defined claim 1, wherein the piston is prestressed resiliently counter to the drive.

9. A vehicle brake system having a hydraulic fluid pump as defined by claim 8.

10. A vehicle brake system having a hydraulic fluid pump as defined by claim 1.

11. The hydraulic fluid pump as defined by claim 1, wherein the housing further comprises an inlet configured to aspirate hydraulic fluid into the piston chamber wherein the second piston part includes an inlet valve in fluid communication with the inlet.

12. The hydraulic fluid pump as defined by claim 11 wherein the sealing element includes a radial outer peripheral region configured to be mounted in a circumferential groove of the housing.

13. The hydraulic fluid pump as defined by claim 12 wherein the diaphragm further comprises an elastic inner region disposed between the radial outer peripheral region, wherein the elastic inner region contacts both the first piston part and the second piston part.

14. The hydraulic fluid pump as defined by claim 13 wherein the elastic inner region is sandwiched between a planar surface of the first piston part and a planar surface of the second piston part.

15. The hydraulic fluid pump as defined by claim 13 wherein the elastic inner region extends continuously between the radial outer peripheral region.

16. A sealing element of a hydraulic fluid pump, which element is provided for insertion into a piston chamber of a housing of the hydraulic fluid pump, in which a piston, including a first piston part and a second piston part, is supported axially movably, which piston is movable by means of a drive, and which element is designed as a diaphragm, which when inserted into the housing is located between the first piston part and the second piston part and penetrates the piston chamber transversely to a direction of motion of the piston, wherein the first piston part rests on the drive and the housing includes a circumferential groove configured to mount the sealing element.

17. The sealing element as defined by claim 16 further comprising a radial outer peripheral region configured to be mounted in the circumferential groove.

18. The sealing element as defined by claim 17 wherein the diaphragm includes an elastic inner region disposed between the radial outer peripheral region, wherein the elastic inner region contacts both the first piston part and the second piston part.

19. The sealing element as defined by claim 18 wherein the elastic inner region is sandwiched between a planar surface of the first piston part and a planar surface of the second piston part.

20. The sealing element as defined by claim 19 wherein the elastic inner region extends continuously between the radial outer peripheral region without interruption.

\* \* \* \* \*